US011797294B2

(12) United States Patent
Tabata et al.

(10) Patent No.: US 11,797,294 B2
(45) Date of Patent: Oct. 24, 2023

(54) IN-VEHICLE DEVICE, INFORMATION PROCESSING DEVICE, DOWNLOAD EXECUTION FEASIBILITY DETERMINATION METHOD, PROGRAM, RECORDING MEDIUM

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Masafumi Yamamoto, Nagakute (JP); Yuki Makino, Aichi-gun (JP); Shotaro Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 17/653,318

(22) Filed: Mar. 3, 2022

(65) Prior Publication Data

US 2022/0317991 A1 Oct. 6, 2022

(30) Foreign Application Priority Data

Mar. 5, 2021 (JP) ................................. 2021-035429

(51) Int. Cl.
*G06F 8/65* (2018.01)
*G06F 8/61* (2018.01)
*B60W 50/00* (2006.01)

(52) U.S. Cl.
CPC ................. *G06F 8/65* (2013.01); *G06F 8/61* (2013.01); *B60W 50/00* (2013.01); *B60W 2050/0083* (2013.01); *B60W 2556/45* (2020.02)

(58) Field of Classification Search
None
See application file for complete search history.

(56) References Cited

U.S. PATENT DOCUMENTS

2013/0013414 A1* 1/2013 Haff ................... G06Q 30/0241
705/14.64
2014/0277831 A1* 9/2014 Hunt ..................... G07C 5/008
701/1

(Continued)

FOREIGN PATENT DOCUMENTS

JP 2017-90092 A 5/2017
JP 2018-100002 A 6/2018
JP 2020-62936 A 4/2020

*Primary Examiner* — Philip Wang
*Assistant Examiner* — Rongfa P Wang
(74) *Attorney, Agent, or Firm* — Oblon, McClelland, Maier & Neustadt, L.L.P.

(57) ABSTRACT

A central ECU includes a download execution feasibility determination unit that determines whether or not execution of download of data from an external distribution server of a vehicle is feasible based on position information of the vehicle, a download execution unit that executes the download in a case where the download execution feasibility determination unit determines that the execution of the download is feasible, and a transmission unit that records execution failure result information including position information of the vehicle when the download is executed by the download execution unit and fails, in an external monitoring server of the vehicle, in which the download execution feasibility determination unit determines whether or not the execution of the download is feasible based on the execution failure result information recorded in the distribution server and the current position information of the vehicle.

15 Claims, 6 Drawing Sheets

(56) References Cited

U.S. PATENT DOCUMENTS

| | | | | |
|---|---|---|---|---|
| 2018/0321047 A1* | 11/2018 | Sagawa | .................. | H04W 4/02 |
| 2019/0258467 A1* | 8/2019 | Frantz | ................ | G01C 21/3691 |
| 2019/0332371 A1* | 10/2019 | Kobayashi | ............. | G07C 5/008 |
| 2019/0344799 A1* | 11/2019 | Tiwari | ............. | B60W 60/0015 |
| 2020/0174780 A1* | 6/2020 | Gintz | ........................ | G06F 8/66 |
| 2020/0371773 A1* | 11/2020 | Kato | .................. | G01C 21/3885 |
| 2021/0180979 A1* | 6/2021 | Kitahara | ............. | G08G 1/0129 |
| 2021/0183099 A1* | 6/2021 | Fujii | ....................... | G06T 7/248 |
| 2022/0316919 A1* | 10/2022 | Ukai | ...................... | H04L 67/06 |

* cited by examiner

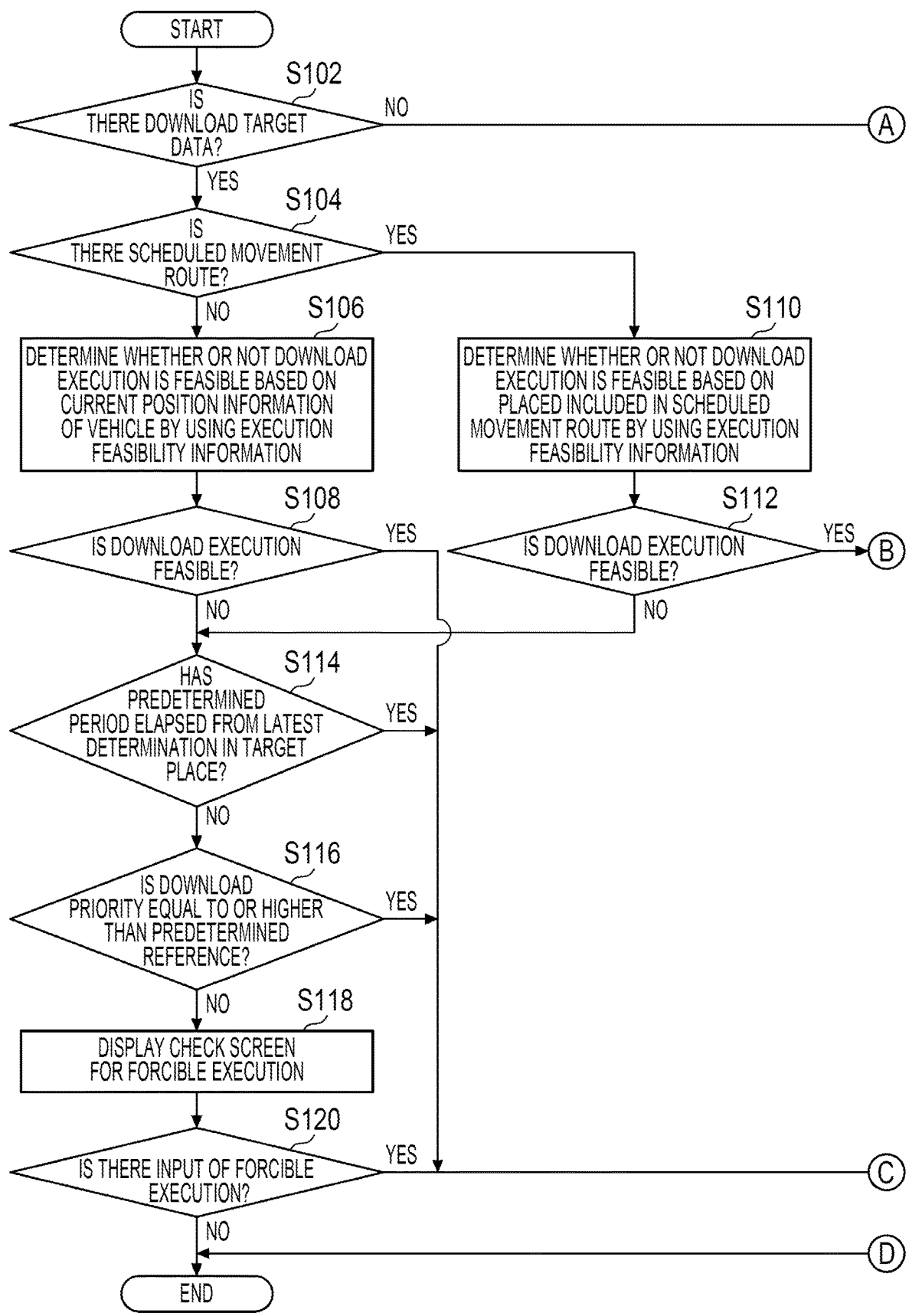

IN-VEHICLE DEVICE, INFORMATION PROCESSING DEVICE, DOWNLOAD EXECUTION FEASIBILITY DETERMINATION METHOD, PROGRAM, RECORDING MEDIUM

CROSS-REFERENCE TO RELATED APPLICATION

This application claims priority to Japanese Patent Application No. 2021-035429 filed on Mar. 5, 2021, incorporated herein by reference in its entirety.

BACKGROUND

1. Technical Field

The present disclosure relates to an in-vehicle device, an information processing device, a download execution feasibility determination method, a program, and a recording medium.

2. Description of Related Art

In the related art, there is a technique of downloading data (for example, a program for updating an in-vehicle device, or parameter data used for control processing in the in-vehicle device) from an external device of a vehicle through a communication device mounted on the vehicle (refer to Japanese Unexamined Patent Application Publication No. 2017-90092 (JP 2017-90092 A)).

In JP 2017-90092 A, an adaptive section suitable for download and an unsuitable section unsuitable for download are defined in advance, and the download is started such that the download is completed while traveling in the adaptive section. Consequently, it is possible to suppress a situation in which download fails and the download is required again, or the download is interrupted and restarted repeatedly, and thus to improve a success ratio of the download.

SUMMARY

However, if a place suitable for download and a place unsuitable for download are defined in advance as in JP 2017-90092 A, a place suitable for download may change to an unsuitable place or unsuitable place may change to a suitable place due to changes in a communication environment or the like. As a result, a success ratio of download may decrease.

Therefore, in view of the above problems, the present disclosure provides a technique capable of more appropriately improving a success ratio of data download from an external device to a vehicle.

A first aspect of the present disclosure relates to an in-vehicle device including a position information acquisition unit, a determination unit, a download execution unit, and a recording unit.

The position information acquisition unit acquires position information of a vehicle.

A determination unit determines whether or not download of data from a distribution device outside the vehicle is executable, the download being executed via a communication device mounted on the vehicle, based on the position information of the vehicle.

The download execution unit executes the download in a case where there is target data of the download and the determination unit determines that the download is executable.

The recording unit records first information including position information of the vehicle when the download is executed by the download execution unit and fails, in a storage unit of the vehicle, or in a storage device outside the vehicle via the communication device.

The determination unit determines whether or not the download is executable based on the first information recorded in the storage unit or the storage device and current position information of the vehicle.

A second aspect of the present disclosure relates to an information processing device including a storage unit, an information generation unit, and a transmission unit.

The storage unit records first information including position information when download of data from a distribution device outside a vehicle fails, the position information being received from each of a plurality of vehicles.

The information generation unit generates information regarding whether or not the download of data from the distribution device to the vehicle is feasible in each of a plurality of places within a geographically predetermined range based on the first information recorded in the storage unit.

The transmission unit transmits the information to the vehicles.

Other aspects of the present disclosure are realized by a download execution feasibility determination method, a program, and a recording medium.

According to the above aspects, a success ratio of downloading data from the external device to the vehicle can be improved more appropriately.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5A is a flowchart schematically showing an example of control processing of a vehicle (central ECU)

DETAILED DESCRIPTION OF EMBODIMENTS

Hereinafter, embodiments will be described with reference to the drawings.

Outline of Vehicle Monitoring System

First, an outline of a vehicle monitoring system according to the present embodiment will be described with reference to FIG. 1.

Figure 1:
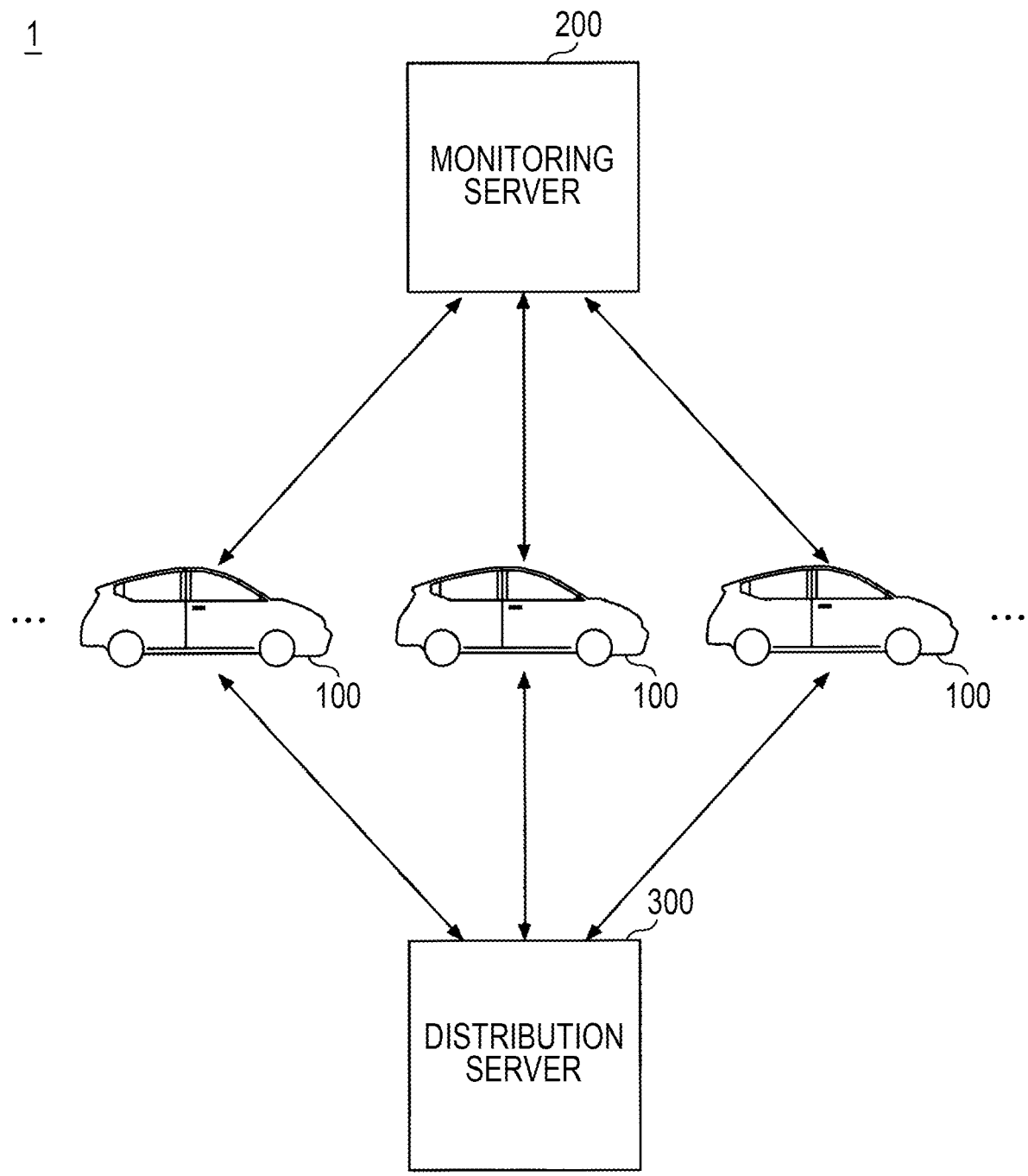
FIG. 1 is a schematic diagram showing an example of a vehicle monitoring system.

FIG. 1 is a schematic diagram showing an example of a vehicle monitoring system 1.

As shown in FIG. 1, the vehicle monitoring system 1 includes a plurality of vehicles 100, a monitoring server 200, and a distribution server 300.

The vehicle monitoring system 1 monitors various states of each of the vehicles 100 in the monitoring server 200.

Specifically, the vehicle monitoring system 1 monitors a relationship between a position of the vehicle 100 and the success or failure of download when data is downloaded from the distribution server 300 to the vehicle 100 in the monitoring server 200.

As will be described later, the vehicle 100 is equipped with a communication device 10 and is configured to be able to communicate with external devices such as the monitoring server 200 and the distribution server 300 via a predetermined communication line. Consequently, the vehicle 100 can transmit an information signal (data) to the monitoring server 200 or receive an information signal or a control signal from the monitoring server 200. The vehicle 100 can download data from the distribution server 300.

The predetermined communication line includes, for example, a mobile communication network with a base station as a terminal end, a satellite communication network using a communication satellite, and a wide area network (WAN) such as an Internet network. The predetermined communication line may include, for example, a local area network (LAN) of a facility where the monitoring server 200 is installed. The predetermined communication line may include, for example, a short-range communication line based on a wireless communication standard such as WiFi or Bluetooth (registered trademark). Hereinafter, the same may apply to a communication line or the like used for communication between the vehicle 100 and the distribution server 300.

As described above, the monitoring server 200 (an example of a storage device or an information processing device) monitors a relationship between a position of the vehicle 100 and the success or failure of download when data is downloaded from the distribution server 300 to the vehicle 100. Based on a monitoring result, the monitoring server 200 generates information regarding feasibility of download execution (hereinafter, "execution feasibility information") from the distribution server 300 in each of a plurality of places included in a geographical target range (hereinafter, simply "target range") to the vehicle 100.

The target range may be, for example, the entire country, a part of a country, or a range that spans a plurality of countries. A plurality of places are defined by dividing the target range according to a predetermined rule. For example, a plurality of places are defined by a zone including a plurality of equally spaced representative points defined by latitude and longitude within the target range.

The monitoring server 200 is communicatively connected to the vehicle 100 via a predetermined communication line. Consequently, the monitoring server 200 can receive various information signals or control signals from the vehicle 100, and can transmit various information signals or control signals to the vehicle 100. Specifically, the monitoring server 200 may receive information regarding the success or failure of download of data from the vehicle 100, and monitor a relationship between a position of the vehicle 100, a position of the vehicle 100 when the data is downloaded, and the success or failure of the download. The monitoring server 200 may transmit the execution feasibility information to a plurality of vehicles 100.

The distribution server 300 (an example of a distribution device) distributes data to a plurality of vehicles 100. Data that is a distribution target of the distribution server 300 corresponds to data that is a download target seen from the vehicle 100. The data that is a distribution target includes, for example, program data for software of various electronic control units (ECUs) of the vehicle 100. The various ECUs include a gateway ECU 20, an ECU 30, a central ECU 80 and the like, which will be described later. The program data that is a distribution target may be new program data to be installed in the vehicle 100 (ECU), or may be update data of a program already installed in the vehicle 100 (ECU). The data that is a distribution target includes, for example, data of various parameters referred to in processes of various ECUs of the vehicle 100. The data of various parameters may be, for example, data of new parameters registered by updating a program or installing a new program, or data for updating data of parameters already registered in the vehicle 100 (ECU).

The distribution server 300 is communicatively connected to each of the vehicles 100 via a predetermined communication line. Consequently, the distribution server 300 can distribute data to the vehicles 100.

The function of the monitoring server 200 and the function of the distribution server 300 may be integrated into one server.

Hardware Configuration of Vehicle Monitoring System

Next, the hardware configuration of the vehicle monitoring system 1 will be described with reference to FIGS. 2 and 3 in addition to FIG. 1.

Vehicle Hardware Configuration

Figure 2:
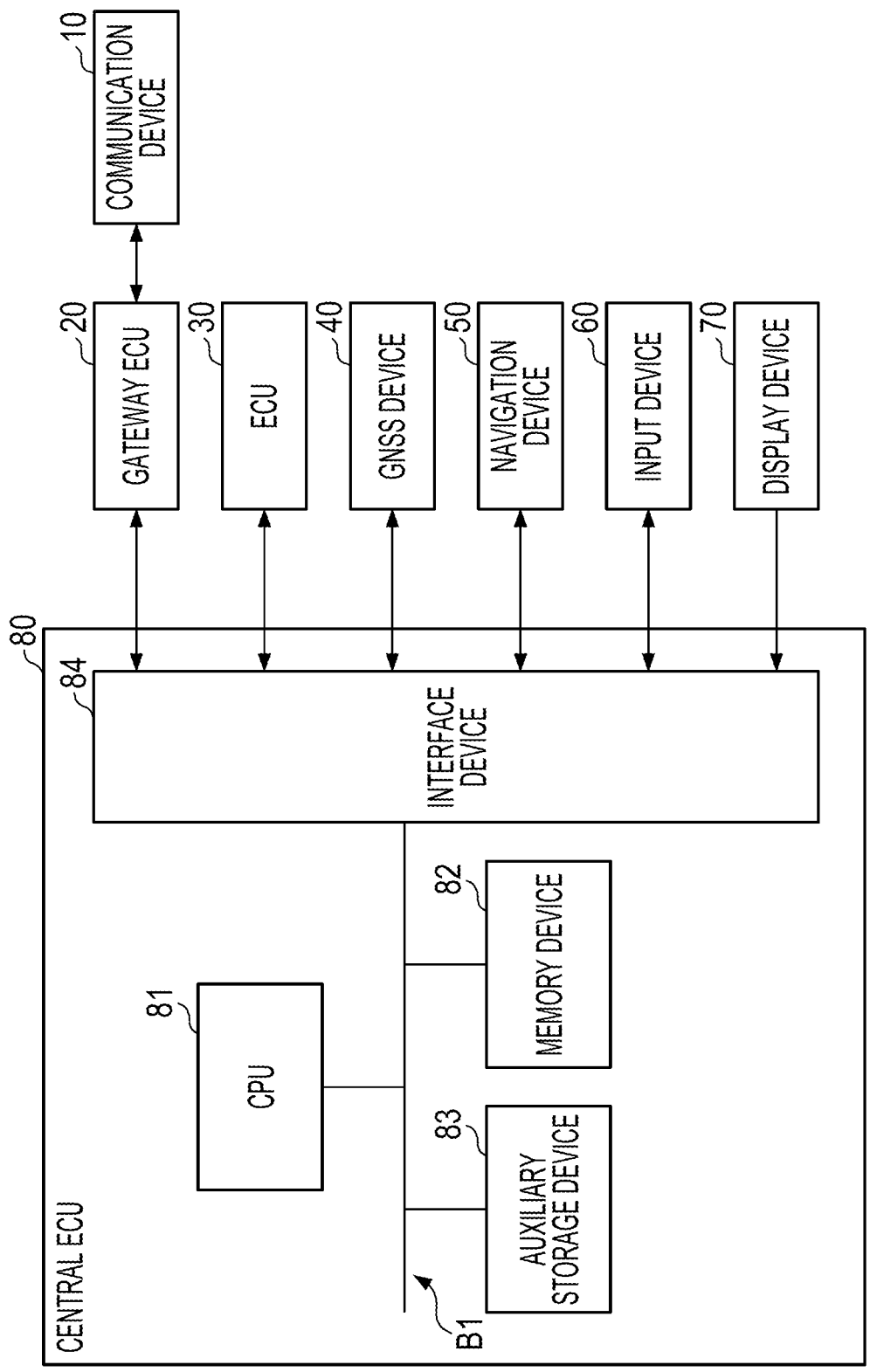
FIG. 2 is a diagram showing an example of a hardware configuration of a vehicle.

FIG. 2 is a diagram showing an example of a hardware configuration of the vehicle 100.

As shown in FIG. 2, the vehicle 100 includes a communication device 10, a gateway ECU 20, an ECU 30, a global navigation satellite system (GNSS) device 40, a navigation device 50, an input device 60, a display device 70, and a central ECU 80.

The communication device 10 communicates with the outside of the vehicle 100 via a predetermined communication line. The communication device 10 is, for example, a mobile communication module connected to a mobile communication network with a base station as a terminal end and capable of communicating with the outside, and specifically, may be a data communication module (DCM). The communication device 10 is communicatively connected to the central ECU 80 via a one-to-one communication line or an in-vehicle network. For example, the communication device 10 may transmit a predetermined signal to the outside in response to a command (request) from the gateway ECU 20. A signal received from the outside by the communication device 10 is incorporated into the gateway ECU 20.

The gateway ECU 20 functions as a gateway between a communication line outside the vehicle 100 and a communication line inside the vehicle 100.

The function of the gateway ECU 20 may be realized by any hardware or a combination of any hardware and software. For example, the gateway ECU 20 may have the same hardware configuration as that of the central ECU 80 that will be described later, and realize various functions by loading a program installed in an auxiliary storage device to a memory device and executing the program on a central processing unit (CPU). Hereinafter, the same may apply to the ECU 30.

For example, the gateway ECU 20 uses a known method to authenticate that a signal received from the outside by the communication device 10 is a signal transmitted from an approved transmission source and has not been tampered. The approved transmission source means a transmission source registered as a transmission source in advance (for example, the monitoring server 200), a source that has been authenticated in advance through mutual communication, and the like. The gateway ECU 20 transmits only data of a signal for which authentication is successful among signals received by the communication device 10 to a predetermined in-vehicle device (for example, the central ECU 80) via the communication line inside the vehicle 100. The communication line inside the vehicle 100 is, for example, a one-to-one communication line or an in-vehicle network. The in-vehicle network is, for example, Controller Area Network (CAN), Local Interconnect Network (LIN), FlexRay, or in-vehicle Ethernet.

For example, the gateway ECU 20 generates an information signal in response to a request from various devices of the vehicle 100, and transmits the information signal to a predetermined transmission destination (for example, the monitoring server 200) via the communication device 10.

One or more ECUs 30 are mounted on the vehicle 100. The ECUs 30 perform various types of control of the vehicle 100. The ECUs 30 includes, for example, an ECU that controls an engine of the vehicle 100 and an ECU that controls a shift position of a transmission of the vehicle 100.

The GNSS device 40 receives positioning signals from a plurality of positioning satellites in the sky, and acquires (calculates) position information of the vehicle 100 (own vehicle) based on the positioning signals. The GNSS device 40 is, for example, a GPS sensor that uses a positioning signal from a global positioning system (GPS) satellite. An output of the GNSS device 40 is incorporated into the central ECU 80 via a one-to-one communication line or an in-vehicle network.

The navigation device 50 provides route guidance from a predetermined place (for example, the current place) to a destination via, for example, the display device 70. The route from the predetermined place to the destination may be a route retrieved by the navigation device 50 and selected by a user from among candidate routes as a retrieval result via the input device 60. The route from the predetermined place to the destination may be a route retrieved by, for example, an external navigation server that can be connected via the navigation device 50 and the communication device 10 and selected by a user from among candidate routes as a retrieval result via the input device 60. The route from the predetermined place to the destination may be automatically generated based on, for example, a past movement history of the vehicle 100 and the current situation of the vehicle 100 (for example, a time, a position, and classification of an occupant). The navigation device 50 is communicatively connected to the central ECU 80 via, for example, a one-to-one communication line or an in-vehicle network. Consequently, the central ECU 80 can acquire various types of information included in the navigation device 50, for example, information regarding a route that is a guidance target (hereinafter, "guidance target route information") from the navigation device 50.

The input device 60 is provided in the cabin of the vehicle 100 and receives various inputs from an occupant. The input device 60 includes, for example, an operation input device such as a button, a toggle, a lever, a touch panel, or a touch pad that receives an operation input from an occupant. The input device 60 includes a voice input device such as a microphone that receives voice input of an occupant of the vehicle 100. The input device 60 includes a gesture input device that receives gesture input of an occupant of the vehicle 100, such as a camera capable of capturing an image of the occupant in the cabin of the vehicle 100. The input device 60 is communicatively connected to the central ECU 80 via, for example, a one-to-one communication line or an in-vehicle network, and an input signal representing details of an input received by the input device 60 is incorporated into the central ECU 80.

The display device 70 is provided in a location easily visible to an occupant on a driver seat or a passenger seat in the cabin of the vehicle 100, and displays various information screens. The display device 70 is, for example, a liquid crystal display or an organic electroluminescence (EL) display. The display device 70 is communicatively connected to the central ECU 80 via, for example, a one-to-one communication line or an in-vehicle network, and the central ECU 80 may output a control signal to the display device 70 and display a predetermined information screen on the display device 70.

The central ECU 80 (an example of an in-vehicle device) is used, for example, as an upper control device of lower ECUs including the gateway ECU 20 and the ECU 30 mounted on the vehicle 100, to collectively control operations of the lower ECUs, or as a storage source storing various types of data.

The function of the central ECU 80 may be realized by any hardware or a combination of any hardware and software. For example, as shown in FIG. 2, the central ECU 80 includes a CPU 81, a memory device 82, an auxiliary storage device 83, and an interface device 84, each of which is configured centered on a computer connected to a bus B1.

The CPU 81 executes a program loaded in the memory device 82, and realizes various functions of the central ECU 80 according to instructions of the program.

The memory device 82 loads a program in the auxiliary storage device 83 such that the CPU 81 can read the program, for example, when there is an instruction for starting the program. The memory device 82 is, for example, a random access memory (RAM).

The auxiliary storage device 83 is nonvolatile storage means, and stores programs to be installed and also stores necessary files, data, and the like. The auxiliary storage device 83 is, for example, a read only memory (ROM).

The interface device 84 is used, for example, as an interface for connection to an in-vehicle network or connection to various sensors, actuators, and the like on a one-to-one basis. The interface device 84 may include a plurality of different types of interface devices depending on targets to be connected.

A program that realizes various functions of the central ECU 80 is provided, for example, by a dedicated tool (an example of a recording medium) connected to a predetermined connector for external connection via a detachable cable. The connector for external connection is, for example, a data link coupler (DLC) and is connected to an in-vehicle network to which the central ECU 80 is connected. The program is installed in the auxiliary storage device 83 of the central ECU 80 from the dedicated tool via the cable, the connector, and the in-vehicle network in response to a predetermined operation in the dedicated tool. The program may be downloaded from another computer (for example, the monitoring server 200) outside the vehicle 100 via a predetermined communication line and installed in the auxiliary storage device 83. The same may apply to programs that realize the various functions of the gateway ECU 20 and the ECU 30 described above.

Hardware Configuration of Monitoring Server

Figure 3:
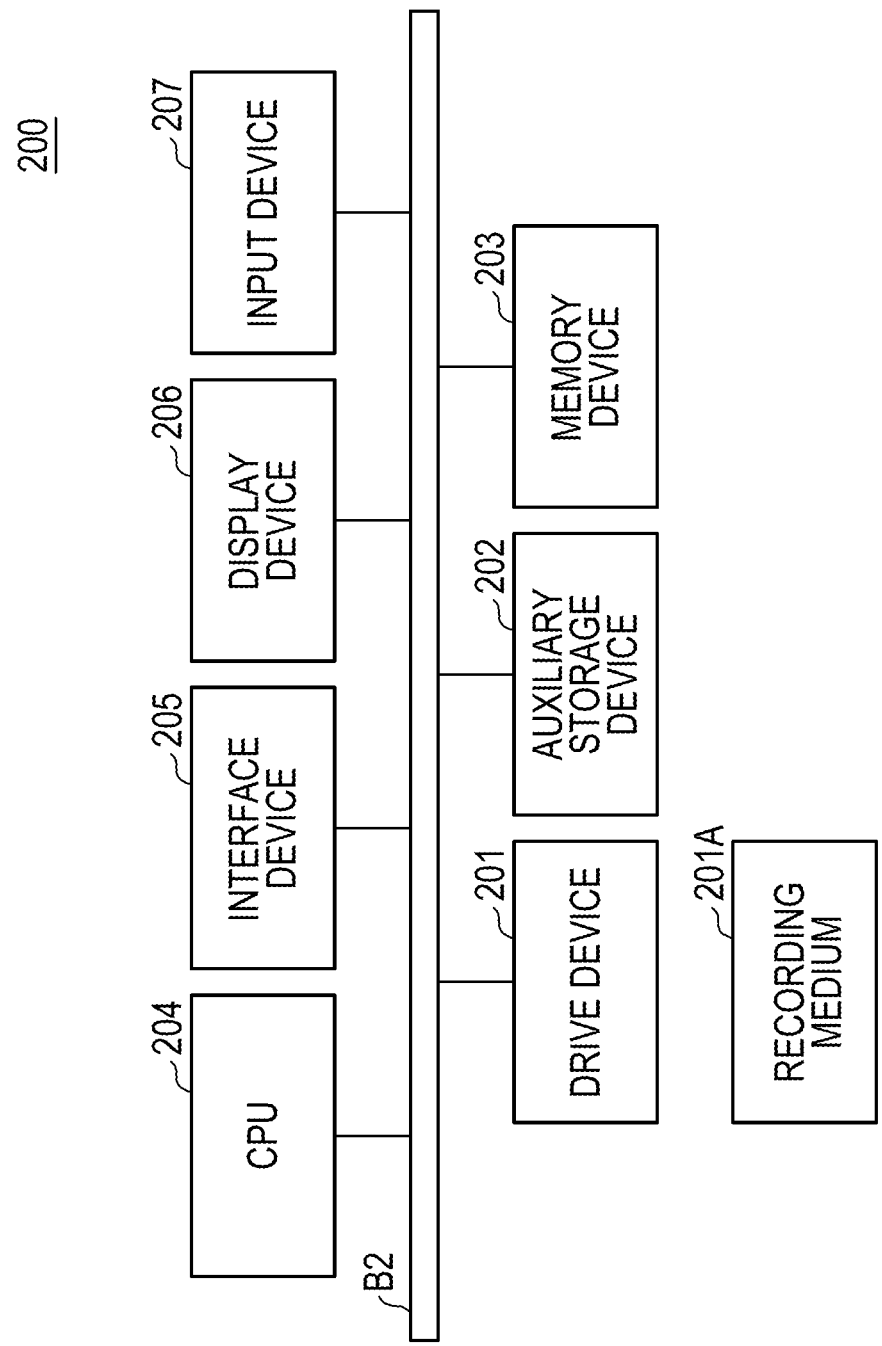
FIG. 3 is a diagram showing an example of a hardware configuration of a monitoring server.

FIG. 3 is a diagram showing an example of a hardware configuration of the monitoring server 200.

The function of the monitoring server 200 may be realized by any hardware, or a combination of any hardware and software. For example, as shown in FIG. 3, the monitoring server 200 includes a drive device 210, an auxiliary storage device 220, a memory device 230, a CPU 240, an interface device 250, a display device 260, and an input device 270, which are connected to each other via a bus B2.

The distribution server 300 may have the same hardware configuration as that of the monitoring server 200. Hereinafter, illustration or description of a hardware configuration of the distribution server 300 will be omitted.

A program that realizes various functions of the monitoring server 200 is provided by a portable recording medium 210A such as a compact disc read only memory (CD-ROM), a digital versatile disc read only memory (DVD-ROM), or a Universal Serial Bus (USB) memory. When the recording medium 210A on which the program is recorded is set in the drive device 210, the program is installed in the auxiliary storage device 220 from the recording medium 210A via the drive device 210. The program may also be downloaded from another computer via the communication network and installed in the auxiliary storage device 220.

The auxiliary storage device 220 stores various installed programs, and also stores necessary files, data, and the like.

The memory device 230 reads the program from the auxiliary storage device 220 and stores the program when there is an instruction for starting the program.

The CPU 240 executes various programs stored in the memory device 230, and realizes various functions related to the monitoring server 200 according to the programs.

The interface device 250 is used as an interface for connection to an external communication line. Consequently, the monitoring server 200 can communicate with an external device such as the vehicle 100 via a predetermined communication line.

The display device 260 displays a graphical user interface (GUI) according to, for example, a program executed by the CPU 240.

The input device 270 is used for an operator, an administrator, or the like of the monitoring server 200 to input various operation instructions related to the monitoring server 200.

Functional Configuration of Vehicle Monitoring System

Next, in addition to FIGS. 1 to 3, a functional configuration of the vehicle monitoring system 1 will be described with reference to FIG. 4.

Figure 4:
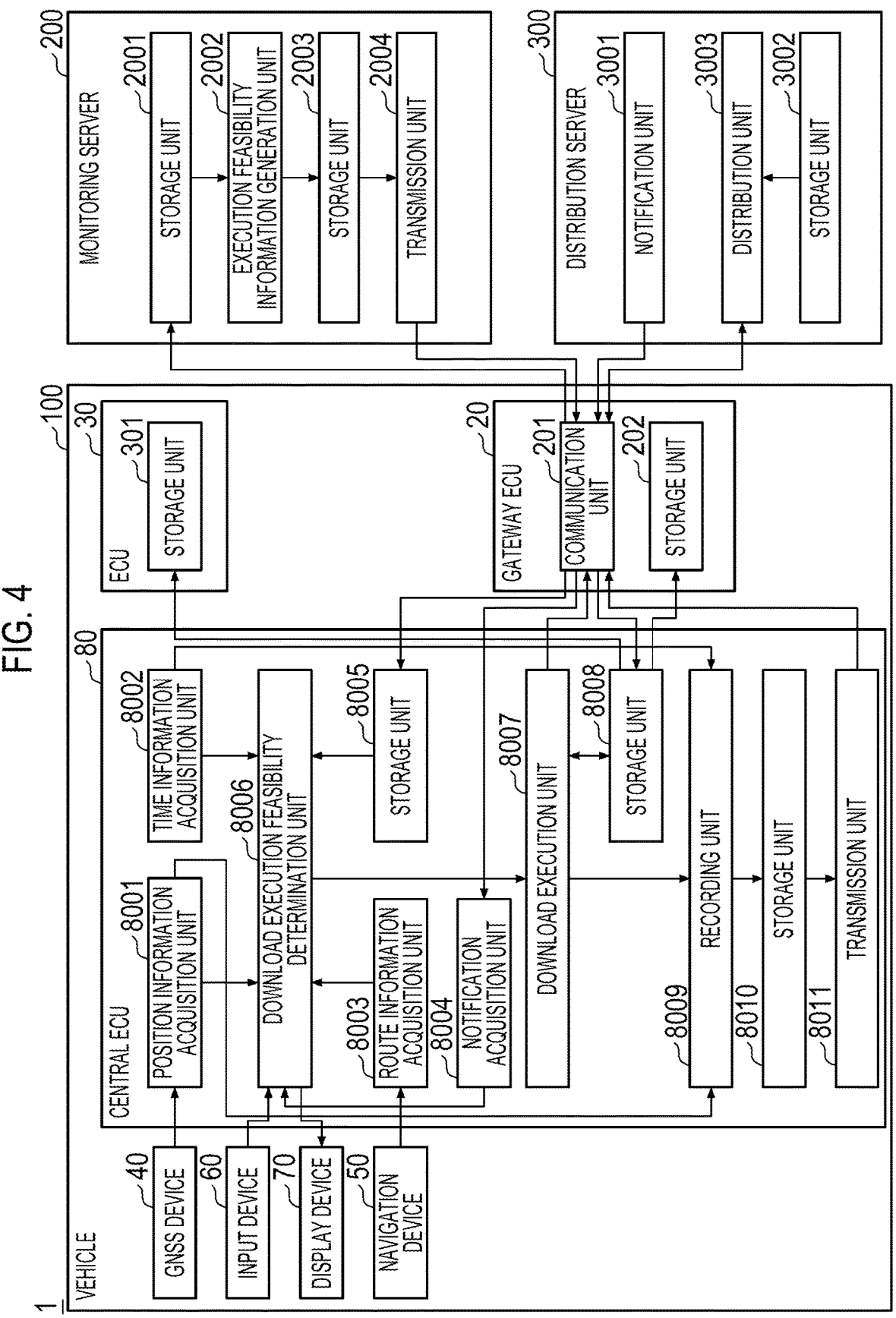
FIG. 4 is a functional block diagram showing an example of a functional configuration of the vehicle monitoring system.

FIG. 4 is a functional block diagram showing an example of the functional configuration of the vehicle monitoring system 1.

Functional Configuration of Vehicle

As shown in FIG. 4, the gateway ECU 20 includes a communication unit 201 and a storage unit 202 as functional units. A function of the communication unit 201 may be realized, for example, by loading a program installed in an auxiliary storage device of the gateway ECU 20 to a memory device and executing the program on a CPU. A function of the storage unit 202 may be realized, for example, by a storage area defined in the auxiliary storage device of the gateway ECU 20.

The communication unit 201 controls the communication device 10 to incorporate a signal received from the outside of the vehicle 100 into the gateway ECU 20 or to transmit the signal to the outside of the vehicle 100.

Various types of data used by the gateway ECU 20 are stored in the storage unit 202. For example, data of various programs installed in the gateway ECU 20 is registered (stored) in the storage unit 202. For example, data of parameters or the like referred to in various processes of the gateway ECU 20 is registered (stored) in the storage unit 202.

The ECU 30 includes a storage unit 301 as a functional unit. A function of the storage unit 301 is realized, for example, by a storage area defined in an auxiliary storage device of the ECU 30.

Various types of data used by the ECU 30 are stored in the storage unit 301. For example, data of various programs installed in the ECU 30 (auxiliary storage device) is registered (stored) in the storage unit 301. For example, data of parameters or the like referred to in various processes of the ECU 30 is registered (stored) in the storage unit 301.

The central ECU 80 includes, as functional units, a position information acquisition unit 8001, a time information acquisition unit 8002, a route information acquisition unit 8003, a notification acquisition unit 8004, a storage unit 8005, a download execution feasibility determination unit 8006, a download execution unit 8007, a storage unit 8008, a recording unit 8009, a storage unit 8010, and a transmission unit 8011. Functions of the position information acquisition unit 8001, the time information acquisition unit 8002, the route information acquisition unit 8003, the notification acquisition unit 8004, the download execution feasibility determination unit 8006, the download execution unit 8007, the recording unit 8009, the transmission unit 8011, and the like are realized, for example, by loading programs installed in the auxiliary storage device 83 to the memory device 82 and executing the program in the CPU 81. Functions of the storage units 8005, 8008, and 8010, and the like are realized, for example, by a storage area of the memory device 82 or the auxiliary storage device 83.

The position information acquisition unit 8001 acquires the current position information of the vehicle 100. The position information acquisition unit 8001 acquires the current position information of the vehicle 100 based on, for example, an output of the GNSS device 40. The position information acquisition unit 8001 may acquire the current position information of the vehicle 100 according to a positioning method other than a method using the output of the GNSS device 40, such as base station positioning.

The time information acquisition unit 8002 acquires information regarding the current time (hereinafter, "time information"). The time information includes both information regarding a so-called date (for example, year, month, and day) and information regarding the time of day (for example, hour, minute, and second). The time information acquisition unit 8002 acquires time information based on, for example, an output of a system clock of an operating system (OS) operating on the CPU 81 of the central ECU 80.

The route information acquisition unit 8003 acquires information regarding a scheduled movement route of the vehicle 100 (hereinafter, "scheduled movement route information"). For example, the route information acquisition unit 8003 acquires the scheduled movement route information based on guidance target route information acquired from the navigation device 50. In this case, the route information acquisition unit 8003 may consider, as a scheduled movement route, a route portion closer to a destination than the current position of the vehicle 100 among guidance target routes designated by the guidance target route information.

The notification acquisition unit 8004 (an example of a priority information acquisition unit) acquires, from the gateway ECU 20, a notification indicating the presence of download target data (hereinafter, "download notification"), which is received from the distribution server 300 via the communication device 10. The download notification includes, for example, information regarding a priority of download (hereinafter, "download priority") of download target data (hereinafter, "priority information"). For example, from the viewpoint of security or safety of the vehicle 100, the download priority is set to become higher as the urgency of new registration or update of data in the vehicle 100 (ECU) increases.

Information regarding whether or not download execution is feasible (hereinafter, "execution feasibility information"), received from the monitoring server 200 via the communication device 10 is incorporated into and stored in the storage unit 8005 from the gateway ECU 20. Details of the execution feasibility information will be described later.

The download execution feasibility determination unit 8006 (an example of a determination unit) determines, when there is download target data from the distribution server 300, whether or not download of the target data is feasible (that is, whether or not the data is to be downloaded). Details thereof will be described later.

When the download execution feasibility determination unit 8006 determines that download execution is feasible, the download execution unit 8007 accesses the distribution server 300 via the gateway ECU 20 (communication device 10) and executes the download of the target data. For example, the download execution unit 8007 transmits a download request signal to the distribution server 300.

The storage unit 8008 stores (preserves) the data downloaded from the distribution server 300 through the process of the download execution unit 8007.

For example, when the central ECU 80 succeeds in downloading the data registered in a lower ECU, the central ECU 80 notifies the lower ECU that is a data registration destination at a predetermined timing. The lower ECU reads the data from the storage unit 8008 and writes the data into an internal storage unit (for example, the storage units 202, 301) in response to the notification, and thus the registration of the data is completed. For example, when the central ECU 80 succeeds in downloading the data registered therein, the central ECU 80 registers (for example, installs) the data immediately after the download or at a predetermined timing. The predetermined timing may be, for example, when an accessory switch of the vehicle 100 is turned off (ACC-OFF), that is, when the vehicle 100 is stopped. Consequently, when the accessory switch of the vehicle 100 is turned on, that is, when the vehicle 100 is started next time, the various ECUs can be started in a state of the latest data.

The recording unit 8009 records, in the storage unit 8010, information regarding an execution result of the data download executed by the download execution unit 8007 (hereinafter, "execution result information"). The execution result information includes, for example, position information of the vehicle 100 when the download is executed. In a case where the download is executed while the vehicle 100 is moving, the position information of the vehicle 100 when the download is executed may include a plurality of pieces of position information. The execution result information includes, for example, time information when the download is executed. The time information when the download is executed may be, for example, time information when the success (completion) or the failure of the download is confirmed. The execution result information includes, for example, information regarding the success or failure of the download, that is, information indicating whether the download is successful or unsuccessful (hereinafter, "success/failure information"). In other words, the storage unit 8010 may store execution result information when the download executed by the download execution unit 8007 is successful (hereinafter, "execution success result information") (an example of second information), and execution result information when the download is unsuccessful (hereinafter, "execution failure result information") (an example of first information or third information).

For example, the execution result information may be stored (registered) in the storage unit 8010 as record data including position information of the vehicle 100, time information, success/failure information, and the like for each download executed by the download execution unit 8007. That is, the execution success result information may include position information of the vehicle 100, time information, information indicating the success in the download (hereinafter, "success information"), and the execution failure result information may include position information of the vehicle 100, time information, information indicating the failure in the download (hereinafter, "failure information").

The execution result information is stored in the storage unit 8010.

A part of the execution result information in the storage unit 8010 may be erased as appropriate. For example, the execution result information transmitted to the monitoring server 200 by the transmission unit 8011 may be erased. The execution result information of which a certain period has passed from the recording by the recording unit 8009 may be erased.

The transmission unit 8011 (an example of a recording unit) transmits the execution result information (for example, the above-described record data) stored in the storage unit 8010 for each download execution to the monitoring server 200 via the gateway ECU 20 (communication device 10) at a predetermined timing. Consequently, the transmission unit 8011 can record the execution result information in the monitoring server 200 (a storage unit 2001 that will be described later) via the communication device 10.

Functional Configuration of Monitoring Server

As shown in FIG. 4, the monitoring server 200 includes a storage unit 2001, an execution feasibility information generation unit 2002, a storage unit 2003, and a transmission unit 2004 as functional units. Functions of the execution feasibility information generation unit 2002, the transmission unit 2004, and the like are realized, for example, by loading a program installed in the auxiliary storage device 220 to the memory device 230 and executing the program on the CPU 240. Functions of the storage units 2001, 2003 are realized, for example, by a storage area defined in the auxiliary storage device 220 or the like.

The storage unit 2001 stores execution result information received from the vehicles 100. Specifically, the storage unit 2001 may accumulate the execution result information each time the execution result information is received from the vehicle 100.

Among the pieces of execution result information stored in the storage unit 2001, the execution result information of which a certain period (for example, several months or one year) has passed from the registration may be erased as appropriate. This is because the execution result information after a certain period of time has passed from the acquisition may be different from a success/failure status of downloading the data from the distribution server 300 to the vehicle 100.

The execution feasibility information generation unit 2002 (an example of an information generation unit) generates execution feasibility information based on the execution result information group received from the vehicles 100 and stored in the storage unit 2001. The execution feasibility information generation unit 2002 may generate the execution feasibility information each time the execution feasibility information group of the storage unit 2001 is updated, that is, each time new execution feasibility information is registered in the storage unit 2001. The execution feasibility information generation unit 2002 may generate execution feasibility information through so-called badge processing, for example, at the timing at which a certain amount of new execution result information group is predicted to be accumulated after generation of previous execution feasibility information.

The execution feasibility information is information indicating whether or not data download is feasible from the distribution server 300 to the vehicle 100 for each of a plurality of places within a target range. The execution feasibility information may include, for example, identification information for identifying a target place among a plurality of places (hereinafter referred to as "place identification information") and information indicating whether or not download is feasible in the target place, and may be generated as table information defined for each place. The place identification information is, for example, an identifier (ID) uniquely defined for each of a plurality of places. The place identification information is, for example, geographic coordinate information representing a plurality of places. The geographic coordinate information is, for example, latitude and longitude information indicating a representative location for each of a plurality of places. The geographic coordinate information may be, for example, geographic coordinate information used in known geocoding such as Geohash.

The execution feasibility information generation unit 2002 monitors a success/failure status of download for each of a plurality of places within the target range based on the execution result information group received from the vehicles 100 and stored (recorded) in the storage unit 2001. The execution feasibility information generation unit 2002 generates execution feasibility information in which "download execution feasible" is set for a place where the download is relatively easy to succeed among the places, and "download execution unfeasible" is set for a place where the download is relatively difficult to succeed.

For example, first, the execution feasibility information generation unit 2002 extracts the execution result including the position information of the vehicle 100 corresponding to the target place stored in the storage unit 2001 or the place within a predetermined range from the target place for each of a plurality of places. Consequently, the execution feasibility information generation unit 2002 can extract execution result information of the download executed in a target place or a place within a predetermined range from the target place for each of a plurality of places. The execution feasibility information generation unit 2002 may extract execution result information including position information of the vehicle 100 corresponding to a target place stored in the storage unit 2001 or a place within a predetermined range from the target place and time information corresponding to a time equal to or later than a predetermined time for each of a plurality of places. Consequently, the execution feasibility information generation unit 2002 can extract an execution result of download executed in the target place or the place within the predetermined range from the target place equal to or later than the predetermined time for each of the places. In other words, the execution feasibility information generation unit 2002 can exclude old execution feasibility information earlier than the predetermined time from extraction targets for each of the places.

Subsequently, the execution feasibility information generation unit 2002 determines whether or not the number of pieces of extracted execution result information is equal to or larger than a predetermined number NO for each of the places. The predetermined number NO may be predefined, for example, as a statistical lower limit value at which it is possible to determine whether or not download execution is feasible.

The execution feasibility information generation unit 2002 may determine "download execution feasible" for the target place in a case where the number of pieces of the extracted execution result information is not equal to or larger than the predetermined number NO, that is, smaller than the predetermined number NO. This is because, in a case where the number of pieces of execution result information is relatively small, it is not possible to appropriately determine whether or not download execution is feasible in that place.

On the other hand, in a case where the number of the pieces of extracted execution result information is equal to or larger than the predetermined number NO, the execution feasibility information generation unit 2002 may determine whether or not download execution is feasible based on a proportion of execution failure result information in the extracted execution result information.

For example, in a case where the proportion of the execution failure result information in the extracted execution result information is equal to or more than a predetermined threshold value Th1, the execution feasibility information generation unit 2002 may determine "download execution unfeasible" for the target place. On the other hand, in a case where the proportion of the execution result information in the download execution failure result information is less than the predetermined threshold value Th1, the execution feasibility information generation unit 2002 may determine that the target place is "download execution feasible".

For example, in a case where the execution failure result information in the extracted execution result information has recently appeared consecutively a predetermined number of times N1 (an example of the second predetermined number) or more, the execution feasibility information generation unit 2002 may determine "download execution unfeasible" for the target place. On the other hand, in a case where the execution failure result information in the extracted execution result information has not recently appeared consecutively the predetermined number of times N1 or more, the execution feasibility information generation unit 2002 may determine "download execution feasible" for the target place.

Finally, the execution feasibility information generation unit 2002 may generate execution feasibility information including place identification information, information indicating whether or not download is feasible, and time information included in latest execution result information in the extracted execution result information (hereinafter, "latest time information") for each of the places.

The execution feasibility information generated by the execution feasibility information generation unit 2002 is stored in the storage unit 2003. When the execution feasibility information generation unit 2002 generates new execution feasibility information, the execution feasibility information in the storage unit 2003 is updated to the new execution feasibility information.

The transmission unit 2004 transmits the execution feasibility information in the storage unit 2003 to each of the vehicles 100 via the interface device 250. Specifically, the transmission unit 2004 may transmit the execution feasibility information to each of the vehicles 100 in a case where new execution feasibility information is registered in the storage unit 2003 or in a case where the execution feasibility information in the storage unit 2003 is updated. Consequently, the vehicle 100 (central ECU 80) can use execution feasibility information based on the latest monitoring result regarding the success or failure of download for each of a plurality of places in a target range.

Functional Configuration of Distribution Server

As shown in FIG. 4, the distribution server 300 includes a notification unit 3001, a storage unit 3002, and a distribution unit 3003 as functional units. Functions of the notification unit 3001, the distribution unit 3003, and the like are realized, for example, by loading a program installed in an auxiliary storage device to a memory device and executing the program on a CPU. A function of the storage unit 3002 or the like is realized, for example, by a storage area defined in the auxiliary storage device or the like.

The notification unit 3001 transmits a download notification to the vehicle 100 that is a data distribution destination via the interface device in a case where preparation for distribution of distribution target data to some or all of the vehicles 100 is completed.

The distribution target data is stored (registered) in the storage unit 3002.

In a case where a download request signal is received from the vehicle 100 (central ECU 80), the distribution unit 3003 distributes (transmits) target data to the vehicle 100 that is a transmission source of the download request signal via the interface device.

Details of Data Download Process

Next, details of a data download process by the central ECU 80 will be described with reference to FIGS. 5A and 5B.

Figure 5B:
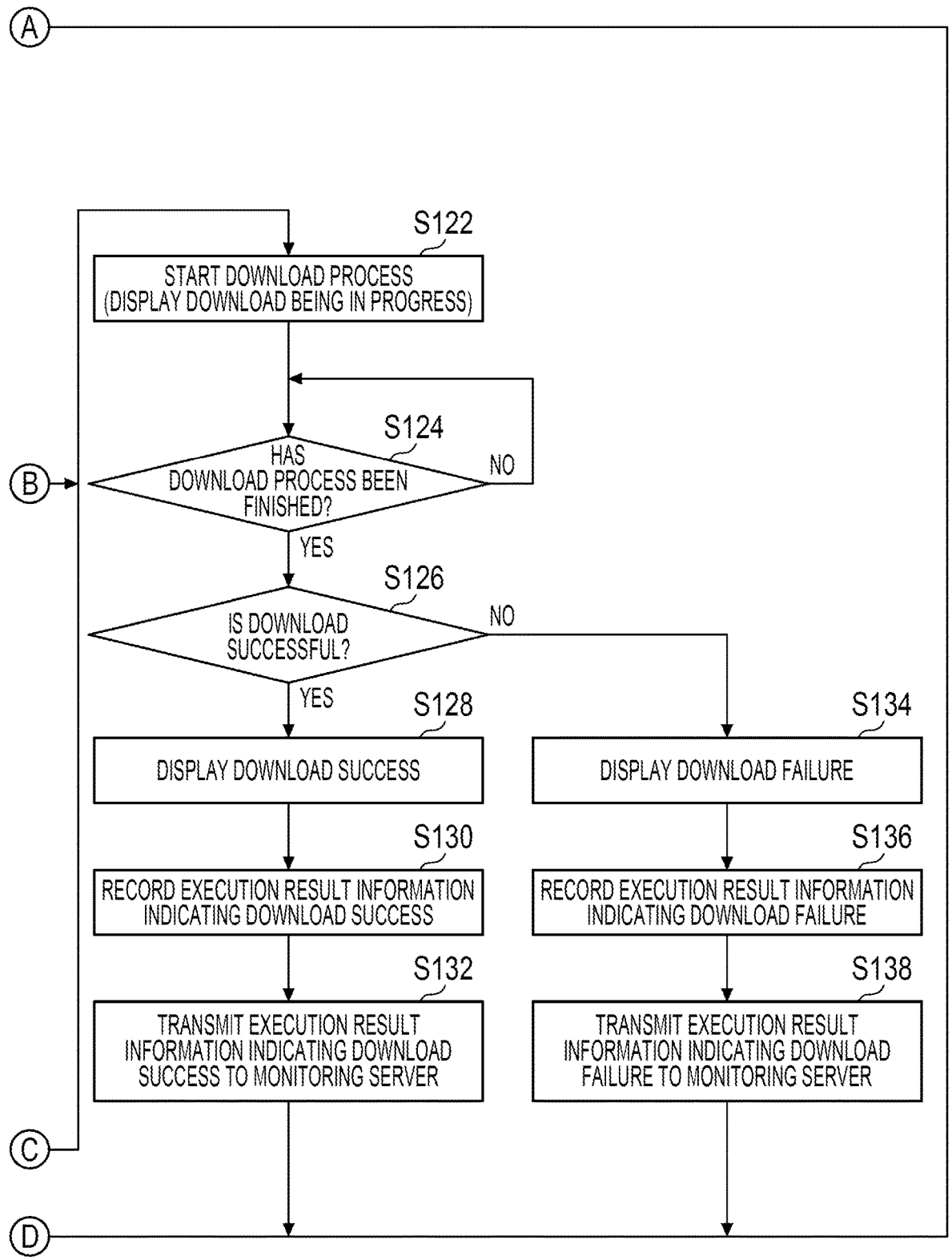
FIG. 5B is the flowchart schematically showing the example of control processing of the vehicle (central ECU).

FIGS. 5A and 5B are flowcharts schematically showing an example of a data download process by the central ECU 80. This flowchart is repeatedly executed, for example, from the start to the stop of the vehicle 100.

As shown in FIGS. 5A and 5B, in step S102, the central ECU 80 determines whether or not there is download target data. Specifically, the central ECU 80 (notification acquisition unit 8004) determines whether or not a download notification for which download has not been executed has been acquired. In a case where there is download target data, the central ECU 80 proceeds to step S104, and in a case where there is no download target data, the central ECU 80 finishes this flowchart.

In step S104, the central ECU 80 determines whether or not there is a scheduled movement route of the vehicle 100. Specifically, the central ECU 80 (route information acquisition unit 8003) may determine whether or not scheduled movement route information can be acquired. The central ECU 80 proceeds to step S106 in a case where there is no scheduled movement route of the vehicle 100, and proceeds to step S110 in a case where there is the scheduled movement route.

In step S106, the download execution feasibility determination unit 8006 determines whether or not download execution is feasible based on the current position information of the vehicle 100 acquired by the position information acquisition unit 8001 by using the execution feasibility information in the storage unit 8005. Specifically, the download execution feasibility determination unit 8006 retrieves execution feasibility information in a place corresponding to the current position information of the vehicle 100 from the execution feasibility information. The download execution feasibility determination unit 8006 determines that data download execution is feasible in a case where information indicating whether or not download execution is feasible in the execution feasibility information in the target place indicates "download execution feasible", and determines that data download execution is unfeasible in a case where the information indicates "download execution unfeasible".

When the process in step S106 is completed, the central ECU 80 proceeds to step S108.

In step S108, the download execution feasibility determination unit 8006 determines whether or not data download execution is feasible as a determination result in step S106. The download execution feasibility determination unit 8006 proceeds to step S122 in a case where the data download execution is feasible, and proceeds to step S114 in a case where the data download execution is unfeasible (that is, execution is not feasible).

In step S110, the download execution feasibility determination unit 8006 determines whether or not download execution is feasible based on a place included in the scheduled movement route (including the current position of the vehicle 100) by using the execution feasibility information in the storage unit 8005. Specifically, the download execution feasibility determination unit 8006 retrieves execution feasibility information in the target place from the execution feasibility information for each place included in a route portion where movement during data download is expected with a place corresponding to the current position information of the vehicle 100 as a starting point in the scheduled movement route. A length of the above route portion may be defined, for example, depending on a data size. A length of the above route portion may be defined based on, for example, not only a data size but also an average vehicle speed of the vehicle 100 for the last few minutes, a speed limit of the scheduled movement route, and the like. The download execution feasibility determination unit 8006 determines that data download execution is unfeasible, for example, in a case where the information indicating whether or not download execution is feasible in the execution feasibility information in the target place indicates "download execution unfeasible" for at least a predetermined number N2 (an example of a third predetermined number) of places included in the above route portion. On the other hand, the download execution feasibility determination unit 8006 determines whether data download execution is feasible in other cases.

When the process in step S110 is completed, the central ECU 80 proceeds to step S112.

The download execution feasibility determination unit 8006 determines whether or not the data download execution is feasible as a determination result in step S110. The download execution feasibility determination unit 8006 proceeds to step S122 in a case where the data download execution is feasible, and proceeds to step S114 in a case where the data download execution is unfeasible (that is, execution is not feasible).

The processes in steps S104, S110, S112 may be omitted.

In step S114, the download execution feasibility determination unit 8006 determines whether or not a predetermined period or more has elapsed since the last determination of download execution feasibility in the target place. In a case where the process in step S106 is executed, the target place is a place corresponding to the current position information of the vehicle 100. In a case where the process in step S110 is executed, the target place is a place where, among places included in the above route portion, information indicating whether or not download execution is feasible in the execution feasibility information is set to "download execution unfeasible". Specifically, the download execution feasibility determination unit 8006 determines whether or not a predetermined period T1 or more has elapsed from the time corresponding to the latest time information included in the execution feasibility information in the target place. The predetermined period T1 is, for example, several months or one year. The download execution feasibility determination unit 8006 proceeds to step S116 in a case where the predetermined period T1 or more has not elapsed since the last determination of download execution feasibility in the target place. On the other hand, in a case where the predetermined period T1 or more has elapsed since the last determination of download execution feasibility in the target place, the download execution feasibility determination unit 8006 determines whether or not data download execution is feasible and proceeds to step S122. This is because, in a case where a certain period has passed since the last determination of download execution feasibility, a communication environment of the target place may have improved.

In step S116, the download execution feasibility determination unit 8006 determines whether or not a download priority of the download target data is equal to or higher than a predetermined reference Th2. In a case where the download priority of the download target data is not equal to or higher than the predetermined reference Th2, the download execution feasibility determination unit 8006 proceeds to step S120. On the other hand, in a case where the download priority of the download target data is equal to or higher than the predetermined reference Th2, the download execution feasibility determination unit 8006 determines that data download execution is feasible, and proceeds to step S122.

In step S118, the download execution feasibility determination unit 8006 displays a check screen for forcing data download to be executed on the display device 70. On the check screen, for example, information indicating that there is download target data and it has been determined that the data download execution is unfeasible may be displayed, and an operation icon for forcing the data download to be executed may also be displayed. Consequently, an occupant of the vehicle 100 can operate the operation icon on the check screen via the input device 60 to forcing the download to be executed.

When the process in step S118 is completed, the central ECU 80 proceeds to step S120.

In step S120, the download execution feasibility determination unit 8006 determines whether or not input for forcing the download to be executed has been received via the input device 60. In a case where the input for forcing the download to be executed has been received, the download execution feasibility determination unit 8006 determines that the data download execution is feasible, and proceeds to step S122. On the other hand, in a case where the input for forcing the download to be executed has not been received, the download execution feasibility determination unit 8006 determines that the data download execution is unfeasible, and finishes the process in this flowchart.

At least one of steps S114, S116, and steps S118, S120 may be omitted.

In step S122, the download execution unit 8007 starts a data download process. The download execution unit 8007 displays a screen indicating that the download is in progress on the display device 70 during the download process.

When the process in step S122 is completed, the central ECU 80 proceeds to step S124.

In step S124, the central ECU 80 determines whether or not the download process has been completed. The central ECU 80 repeatedly executes the process until the download process is completed in a case where the download process has not been completed, and proceeds to step S126 in a case where the download process has been completed.

In step S126, the download execution unit 8007 determines whether or not the data download has been successful. The download execution unit 8007 proceeds to step S128 in a case where the data download has been successful, and proceeds to step S132 in a case where the data download has been unsuccessful.

In step S128, the download execution unit 8007 displays the content indicating that the data download has been successful on the display device 70.

When the process in step S128 is completed, the central ECU 80 proceeds to step S130.

In step S130, the recording unit 8009 generates execution result information (execution success result information) indicating success in the download and records the execution result information in the storage unit 8010.

When the process in step S130 is completed, the central ECU 80 proceeds to step S132.

In step S132, the transmission unit 8011 transmits the execution result information generated in step S130 to the monitoring server 200. Consequently, the monitoring server 200 can acquire (collect) the execution result information (execution success result information) indicating the success in the data download from the vehicle 100.

The execution result information may be transmitted at a timing different from that in the processing in this flowchart. For example, the execution result information may be transmitted to the monitoring server 200 afterward in accordance with a finishing process of the central ECU 80 when the vehicle 100 is stopped. In this case, the process in step S132 is omitted. Hereinafter, the same may apply to the process in step S138.

When the process in step S132 is completed, the central ECU 80 finishes the process in this flowchart.

On the other hand, in step S134, the download execution unit 8007 displays the content indicating that the data download has failed on the display device 70.

When the process in step S134 is completed, the central ECU 80 proceeds to step S136.

In step S136, the recording unit 8009 generates execution result information (execution failure result information) indicating a download failure and records the execution result information in the storage unit 8010.

When the process in step S136 is completed, the central ECU 80 proceeds to step S138.

In step S138, the transmission unit 8011 transmits the execution result information generated in step S136 to the monitoring server 200. Consequently, the monitoring server 200 can acquire (collect) the execution result information (execution failure result information) indicating the failure in the data download from the vehicle 100.

When the process in step S138 is completed, the central ECU 80 finishes the process in this flowchart.

Other Embodiments

Next, other embodiments will be described.

Modifications and changes may be added to the above-described embodiment as appropriate.

For example, in the above-described embodiment, the time information may be omitted from the execution result information.

For example, in the above-described embodiment, only the latter of the execution success result information and the execution failure result information may be recorded in the storage unit 8010 or the storage unit 2001. In this case, the execution feasibility information generation unit 2002 may, for each of a plurality of places, determine "download execution feasible" in a case where the number of pieces of execution result information (execution failure result information) in a target place extracted from the storage unit 2001 equal to or larger than a predetermined number N3 (an example of a first predetermined number), and determine "download execution unfeasible" in a case where the number of the pieces of execution result information is smaller than the predetermined number N3.

In the above-described embodiment and the like, the function of the execution feasibility information generation unit 2002 may be transferred to the vehicle 100 (central ECU 80). In this case, the central ECU 80 may generate execution feasibility information in which only execution result information generated by the vehicle 100 (own vehicle) is reflected or execution result information acquired from another vehicle 100 is reflected. In the latter case, the central ECU 80 may generate (update) execution feasibility information based on execution result information received from another vehicle 100 by the gateway ECU 20 (communication device 10) via the monitoring server 200, or the central ECU 80 may update execution feasibility information based on execution result information of the own vehicle, and share the execution feasibility information by reflecting the update result in other vehicles 100 by using the distributed ledger technology (DLT). In the latter case, the monitoring server 200 may be omitted, and the vehicles 100 may directly communicate with each other without using the monitoring server 200.

Operations

Next, operations of the vehicle monitoring system 1 according to the present embodiment will be described.

For example, a place suitable for downloading data from the distribution server 300 to the vehicle 100 and a place unsuitable for downloading the data are defined in advance, and thus it is possible to promote download in the place suitable for download and thus to improve a success ratio of download.

However, when a place suitable for downloading data from the distribution server 300 to the vehicle 100 and a place unsuitable for downloading the data are defined in advance, a place suitable for download may change to a place unsuitable for download due to changes in a communication environment or the like. A place unsuitable for download may change to a place suitable for download. As a result, a success ratio of download may decrease.

On the other hand, in the present embodiment, the vehicle 100 (central ECU 80) includes the position information acquisition unit 8001, the download execution feasibility determination unit 8006, the download execution unit 8007, and the recording unit 8009. Specifically, the position information acquisition unit 8001 acquires position information of the vehicle 100. The download execution feasibility determination unit 8006 determines whether or not execution of download of data from the external distribution server 300 of the vehicle 100, which is executed via the communication device 10 mounted on the vehicle 100, is executable based on the position information of the vehicle 100. The download execution unit 8007 executes the download in a case where there is download target data and the download execution feasibility determination unit 8006 determines that download execution is feasible. The recording unit 8009 records execution failure result information including position information of the vehicle 100 when the download is executed by the download execution unit 8007 and fails, in the storage unit 8010 of the vehicle 100.

Alternatively, the transmission unit 8011 records execution failure result information including position information of the vehicle 100 when the download is executed by the download execution unit 8007 and fails, in the external monitoring server 200 of the vehicle 100 via the communication device 10. The download execution feasibility determination unit 8006 determines whether or not download execution is feasible based on the execution failure result information recorded in the storage unit 8010 or the monitoring server 200 and the current position information of the vehicle 100.

Consequently, the vehicle monitoring system 1 (central ECU 80) can ascertain, for example, a place where the download is likely to actually fail from the failure result information including position information when the download is executed in the vehicle 100 and fails. Thus, the vehicle monitoring system 1 (central ECU 80) can determine whether or not the download is feasible according to the current position of the vehicle 100 in consideration of a success or failure status of the actual download. Therefore, the vehicle monitoring system 1 (central ECU 80) can more appropriately improve a success ratio of download.

In the present embodiment, the download execution feasibility determination unit 8006 may determine that download execution is unfeasible in a case where the number of pieces of position information corresponding to a place that coincides with or is within a predetermined range of a place corresponding to the current position information of the vehicle 100 is equal to or larger than the predetermined number N3 in the position information recorded in the storage unit 8010 or the monitoring server 200.

Consequently, the vehicle monitoring system 1 can specifically determine whether or not download is feasible according to the current position of the vehicle 100.

In the present embodiment, the recording unit 8009 may record execution failure result information including position information of the vehicle 100 when download is executed by the download execution unit 8007 and fails and execution success result information including position information of the vehicle 100 when download is executed by the download execution unit 8007 and succeeds, in the storage unit 8010. Alternatively, the transmission unit 8011 may record execution failure result information including position information of the vehicle 100 when download is executed by the download execution unit 8007 and fails and execution success result information including position information of the vehicle 100 when download is executed by the download execution unit 8007 and succeeds, in the monitoring server 200 via the communication device 10. The download execution feasibility determination unit 8006 may determine that download execution is unfeasible in a case where there is position information corresponding to a place that coincides with or is within a predetermined range of a place corresponding to the current position information of the vehicle 100 in the position information recorded in the storage unit 8010 or the monitoring server 200, and a proportion of position information when the download fails is the predetermined threshold value Th1 or more, or position information when the download fails has recently appeared consecutively the predetermined number of times N1 or more.

Consequently, the vehicle monitoring system 1 (central ECU 80) can use the execution success result information in addition to the execution failure result information. Therefore, the vehicle monitoring system 1 (central ECU 80) can more appropriately ascertain a success or failure status of actual download. Therefore, the vehicle monitoring system 1 can more appropriately determine whether or not download is feasible according to the current position of the vehicle 100.

In the present embodiment, the vehicle 100 (central ECU 80) may include the time information acquisition unit 8002 that acquires time information. The recording unit 8009 may record execution failure result information including position information and time information of the vehicle 100 when download is executed by the download execution unit 8007 and fails, in the storage unit 8010. Alternatively, the transmission unit 8011 may record execution failure result information including position information and time information of the vehicle 100 when download is executed by the download execution unit 8007 and fails, in the monitoring server 200 via the communication device 10. The download execution feasibility determination unit 8006 may determine that download execution is unfeasible in a case where the number of combinations of position information corresponding to a place that coincides with or is within a predetermined range of a place corresponding to the current position information of the vehicle 100 and corresponding time information after the past predetermined time is the predetermined number N3 or more in combinations of the position information and the time information recorded in the storage unit 8010 or the monitoring server 200.

Consequently, the vehicle monitoring system 1 (central ECU 80) can use only the failure result information that is new to some extent. Therefore, the vehicle monitoring system 1 (central ECU 80) can more appropriately ascertain a success or failure status of actual download. Therefore, the vehicle monitoring system 1 can more appropriately determine whether or not download is feasible according to the current position of the vehicle 100.

In the present embodiment, the vehicle 100 (central ECU 80) may include the time information acquisition unit 8002 that acquires time information. The recording unit 8009 may record execution failure result information including position information and time information of the vehicle 100 when download is executed by the download execution unit 8007 and fails, and execution success result information including position information and time information of the vehicle 100 when the download is executed and succeeds, in the storage unit 8010. Alternatively, the transmission unit 8011 may record execution failure result information including position information and time information of the vehicle 100 when download is executed by the download execution unit 8007 and fails, and execution success result information including position information and time information of the vehicle 100 when the download is executed and succeeds, in the monitoring server 200 via the communication device 10. The download execution feasibility determination unit 8006 may determine that download execution is unfeasible in a case where there is a combination of position information corresponding to a place that coincides with or is within a predetermined range of a place corresponding to the current position information of the vehicle 100 and corresponding time information after the past predetermined time in combinations of the position information and the time information recorded in the storage unit 8010 or the monitoring server 200, and a proportion of a combination of position information and time information when the download fails is the predetermined threshold value Th1 or more, or a combination of position information and time information when the download fails has recently appeared consecutively the predetermined number of times N1 or more.

Consequently, the vehicle monitoring system 1 (central ECU 80) can use the execution success result information in addition to the execution failure result information, and use only the execution result information (the execution failure result information and the execution success result information) that is new to some extent. Therefore, the vehicle monitoring system 1 (central ECU 80) can more appropriately ascertain a success or failure status of actual download. Therefore, the vehicle monitoring system 1 can more appropriately determine whether or not download is feasible according to the current position of the vehicle 100.

In the present embodiment, the vehicle 100 (central ECU 80) may include the route information acquisition unit 8003 that acquires information regarding a scheduled movement route (scheduled movement route information) of the vehicle 100. The download execution feasibility determination unit 8006 may determine that download execution is unfeasible in a case where, for at least the predetermined number N2 of places included in a predetermined route portion with a place corresponding to the current position information of the vehicle 100 as a starting point in the scheduled movement route, the number of pieces of position information corresponding to a place that coincides with or is within a predetermined range of the place is the predetermined number N3 or more in the position information recorded in the storage unit 8010 or the monitoring server 200.

Consequently, the vehicle monitoring system 1 (central ECU 80) can determine whether or not download execution is feasible in consideration of places included in the scheduled movement route of the vehicle 100. Therefore, the vehicle monitoring system 1 (central ECU 80) can more appropriately improve a download success ratio.

In the present embodiment, the vehicle 100 (central ECU 80) may include the route information acquisition unit 8003 that acquires information regarding a scheduled movement route of the vehicle 100. The download execution feasibility determination unit 8006 may determine that download execution is unfeasible in a case where, for at least the predetermined number N2 of places included in a predetermined route portion with a place corresponding to the current position information of the vehicle 100 as a starting point in the scheduled movement route, there is position information corresponding to a place that coincides with or is within a predetermined range of the place in the position information recorded in the storage unit 8010 or the monitoring server 200, and a proportion of position information corresponding to execution failure result information is the predetermined threshold value Th1 or more, or position information corresponding to execution failure result information has recently appeared consecutively the predetermined number of times N1 or more.

Consequently, the vehicle monitoring system 1 (central ECU 80) can determine whether or not download execution is feasible in consideration of places included in the scheduled movement route of the vehicle 100. Therefore, the vehicle monitoring system 1 (central ECU 80) can more appropriately improve a download success ratio.

In the present embodiment, the vehicle 100 (central ECU 80) may include the time information acquisition unit 8002 that acquires time information. The download execution feasibility determination unit 8006 may determine that download execution is feasible regardless of other conditions in a case where determination of download feasibility in a place corresponding to the current position information of the vehicle 100 was performed in the vehicle 100 (own vehicle) or another vehicle 100 that can directly or indirectly communicate with the vehicle 100 (own vehicle) in the past, and the time corresponding to the current time information has passed the predetermined period T1 or more from the time corresponding to time information when the determination was performed last.

Consequently, the vehicle monitoring system 1 (central ECU 80) can determine whether or not download execution is feasible in consideration of not only the current position information of the vehicle 100 but also the possibility of improvement in a communication environment, for example. Therefore, the vehicle monitoring system 1 (central ECU 80) can more appropriately improve a download success ratio.

In the present embodiment, the vehicle 100 (central ECU 80) may include the notification acquisition unit 8004 that acquires information regarding data download priority. in a case where a download priority of download target data is the predetermined reference Th2 or higher, the download execution feasibility determination unit 8006 may determine that download execution is feasible regardless of other conditions.

Consequently, the vehicle monitoring system 1 (central ECU 80) can determine whether or not download execution is feasible in consideration of not only position information of the vehicle 100 but also a data download priority. Thus, the vehicle monitoring system 1 (central ECU 80) can prioritize execution of data download over improvement of a download success ratio or the like for data having a relatively high download priority, such as data having a high urgency in order to improve security or safety of the vehicle 100.

In the present embodiment, in a case where a predetermined input is received from an occupant of the vehicle 100 via the input device 60 of the vehicle 100, the download execution feasibility determination unit 8006 may determine that download execution is feasible regardless of other conditions.

Consequently, the vehicle monitoring system 1 (central ECU 80) can reflect the intentions or findings (for example, recently, the communication environment has been improved) of the occupant of the vehicle 100 in whether or not download execution is feasible. Thus, the vehicle monitoring system 1 can more appropriately improve a download success ratio.

In the present embodiment, execution failure result information including position information of another vehicle 100 when download is executed by the other vehicle 100 that can directly or indirectly communicate with the vehicle 100 (own vehicle) and fails may be recorded in the storage unit 8010 or the monitoring server 200. The download execution feasibility determination unit 8006 may determine whether or not download is feasible based on the execution failure result information of the vehicle 100 (own vehicle) and the execution failure result information of the other vehicle 100 recorded in the storage unit 8010 or the monitoring server 200, and the current position information of the vehicle 100.

Consequently, the vehicle monitoring system 1 (central ECU 80) can ascertain a success or failure status of the download in the vehicles 100. Thus, the vehicle monitoring system 1 (central ECU 80) can more appropriately determine whether or not download is feasible according to the current position of the vehicle 100. Therefore, the vehicle monitoring system 1 (central ECU 80) can more appropriately improve a download success ratio.

In the present embodiment, the monitoring server 200 includes the storage unit 2001, the execution feasibility information generation unit 2002, and the transmission unit 2004. Specifically, the storage unit 2001 records execution failure result information including position information when data download from the external distribution server 300 of the vehicle 100 and fails, received from each of the vehicles 100. The execution feasibility information generation unit 2002 generates information regarding feasibility of download (execution feasibility information) of data from the distribution server 300 to the vehicle 100 in each of a plurality of places within a geographically predetermined range based on the execution failure result information recorded in the storage unit 2001. The transmission unit 2004 transmits the execution feasibility information generated by the execution feasibility information generation unit 2002 to the vehicles 100.

Consequently, the vehicle monitoring system 1 (monitoring server 200) can provide the vehicles 100 with execution feasibility information for determining whether or not download is feasible in consideration of an actual success or failure status of the vehicles 100. Thus, the vehicle monitoring system 1 (monitoring server 200) can more appropriately improve a download success ratio.

Although the embodiments have been described in detail above, the present disclosure is not limited to such a specific embodiment, and various modifications and improvements can be made within the scope of the concept described in the claims.

What is claimed is:

1. An in-vehicle device comprising:
   a position information acquisition unit configured to acquire position information of a vehicle;
   a determination unit configured to determine whether or not download of data from a distribution device outside the vehicle is executable, the download being executed via a communication device mounted on the vehicle, based on the position information of the vehicle;
   a download execution unit configured to execute the download in a case where there is target data of the download and the determination unit determines that the download is executable; and
   a recording unit configured to record first information including position information of the vehicle when the download is executed by the download execution unit and fails, in a storage unit of the vehicle, or in a storage device outside the vehicle via the communication device,
   wherein the determination unit determines whether or not the download is executable based on the first information recorded in the storage unit or the storage device and current position information of the vehicle.

2. The in-vehicle device according to claim 1, wherein the determination unit determines that the download is not executable in a case where the number of pieces of position information corresponding to a place that coincides with or is within a predetermined range of a place corresponding to the current position information of the vehicle is a first predetermined number or more in the position information recorded in the storage unit or the storage device.

3. The in-vehicle device according to claim 1, wherein:
   the recording unit records the first information including the position information of the vehicle when the download is executed by the download execution unit and fails and second information including position information of the vehicle when the download is executed by the download execution unit and succeeds, in the storage unit, or in the storage device via the communication device; and
   the determination unit determines that the download is not executable in a case where there is position information corresponding to a place that coincides with or is within a predetermined range of a place corresponding to the current position information of the vehicle in the position information recorded in the storage unit or the storage device, and a proportion of position information when the download fails is a predetermined threshold value or more, or the position information when the download fails has recently appeared consecutively a second predetermined number or more.

4. The in-vehicle device according to claim 2, further comprising a time information acquisition unit configured to acquire time information, wherein:
the recording unit records the first information including the position information of the vehicle and time information when the download is executed by the download execution unit and fails, in the storage unit, or in the storage device via the communication device; and
the determination unit determines that the download is not executable in a case where the number of combinations of the position information corresponding to the place that coincides with or is within the predetermined range of the place corresponding to the current position information of the vehicle and time information corresponding to a time equal to or later than a past predetermined time is equal to or larger than the first predetermined number among combinations of the position information and the time information recorded in the storage unit or the storage device.

5. The in-vehicle device according to claim 3, further comprising a time information acquisition unit configured to acquire time information, wherein:
the recording unit records the first information including the position information of the vehicle and time information when the download is executed by the download execution unit and fails and the second information including the position information of the vehicle and time information when the download is executed by the download execution unit and succeeds, in the storage unit, or in the storage device via the communication device; and
the determination unit determines that the download is not executable in a case where there is a combination of the position information corresponding to the place that coincides with or is within the predetermined range of the place corresponding to the current position information of the vehicle and time information corresponding to a time equal to or later than a past predetermined time among combinations of the position information and the time information recorded in the storage unit or the storage device, and a proportion of combinations of the position information and the time information when the download fails is the predetermined threshold value or more, or the combinations of the position information and the time information when the download fails have recently appeared consecutively the second predetermined number or more.

6. The in-vehicle device according to claim 2, further comprising a route information acquisition unit configured to acquire information regarding a scheduled movement route of the vehicle, wherein the determination unit determines that the download is not executable in a case where, for at least a third predetermined number of places included in a predetermined route portion with the place corresponding to the current position information of the vehicle as a starting point in the route, the number of pieces of position information corresponding to the place that coincides with or is within the predetermined range of the place is the first predetermined number or more in the position information recorded in the storage unit or the storage device.

7. The in-vehicle device according to claim 3, further comprising a route information acquisition unit configured to acquire information regarding a scheduled movement route of the vehicle, wherein the determination unit determines that the download is not executable in a case where, for at least a third predetermined number of places included in a predetermined route portion with the place corresponding to the current position information of the vehicle as a starting point in the route, there is the position information corresponding to the place that coincides with or is within the predetermined range of the place in the position information recorded in the storage unit or the storage device, a proportion of position information corresponding to the first information is the predetermined threshold value or more, or the position information corresponding to the first information has recently appeared consecutively the second predetermined number or more.

8. The in-vehicle device according to claim 1 further comprising time information acquisition unit configured to acquire time information, wherein the determination unit determines that the download is executable regardless of other conditions in a case where determination of feasibility of the download in a place corresponding to the current position information of the vehicle was performed in the past in the vehicle or another vehicle that can directly or indirectly communicate with the vehicle, and a time corresponding to current time information has passed a predetermined period or more from a time corresponding to time information when the determination was performed last.

9. The in-vehicle device according to claim 1, further comprising a priority information acquisition unit configured to acquire information regarding a priority of the download of data, wherein the determination unit determines that the download is executable regardless of other conditions in a case where the priority of target data of the download is a predetermined reference or higher.

10. The in-vehicle device according to claim 1, the determination unit determines whether the download is executable regardless of other conditions in a case where a predetermined input is received from an occupant of the vehicle via an input device of the vehicle.

11. The in-vehicle device according to claim 1, wherein:
the storage unit or the storage device records a third information including position information of another vehicle when the download is executed by the other vehicle that can directly or indirectly communicate with the vehicle and fails; and
the determination unit determines whether or not the download is feasible based on the first information and the third information recorded in the storage unit or the storage device, and the current position information of the vehicle.

12. An information processing device comprising:
a storage unit configured to record first information including position information when download of data from a distribution device outside a vehicle fails, the position information being received from each of a plurality of vehicles;
an information generation unit configured to generate information regarding whether or not the download of data from the distribution device to the vehicle is feasible in each of a plurality of places within a geographically predetermined range based on the first information recorded in the storage unit; and a transmission unit configured to transmit the information to the vehicles.

13. A download execution feasibility determination method executed by an in-vehicle device mounted on a vehicle, the method comprising:
- a position information acquisition step of acquiring position information of the vehicle;
- a determination step of determining whether or not execution of download of data from a distribution device outside the vehicle is feasible, the download being executed via a communication device mounted on the vehicle, based on position information of the vehicle;
- a download execution step of executing the download in a case where there is target data of the download and it is determined that the download is executable in the determination step; and
- a recording step of recording first information including position information of the vehicle when the download is executed in the download execution step and fails, in a storage unit of the vehicle, or in a storage device outside the vehicle via the communication device,
- wherein in the determination step, whether or not the download is executable is determined based on the first information recorded in the storage unit or the storage device and current position information of the vehicle.

14. A program causing an in-vehicle device mounted on a vehicle to execute:
- a position information acquisition step of acquiring position information of the vehicle;
- a determination step of determining whether or not execution of download of data from a distribution device outside the vehicle is feasible, the download being executed via a communication device mounted on the vehicle, based on position information of the vehicle;
- a download execution step of executing the download in a case where there is target data of the download and it is determined that the download is executable in the determination step; and
- a recording step of recording first information including position information of the vehicle when the download is executed in the download execution step and fails, in a storage unit of the vehicle, or in a storage device outside the vehicle via the communication device,
- wherein in the determination step, whether or not the download is executable is determined based on the first information recorded in the storage unit or the storage device and current position information of the vehicle.

15. A non-transitory computer-readable recording medium on which the program according to claim 14 is recorded.

* * * * *